United States Patent [19]

Takanashi et al.

[11] 3,846,579

[45] Nov. 5, 1974

[54] COLOR TELEVISION SIGNAL GENERATING APPARATUS

[75] Inventors: Itsuo Takanashi; Tadayoshi Miyoshi, both of Yokohama; Koji Uesaka, Tokyo; Kenichi Miyazaki, Sagamihara; Sumio Yokokawa, Yokohama, all of Japan

[73] Assignee: Victor Company of Japan, Ltd., Yokohama City, Kanagawa-ken, Japan

[22] Filed: May 31, 1973

[21] Appl. No.: 365,581

[30] Foreign Application Priority Data

June 3, 1972 Japan .............................. 41-55230
June 20, 1972 Japan .............................. 47-61531
Aug. 20, 1972 Japan .............................. 47-83158
Mar. 23, 1973 Japan .............................. 48-33246

[52] U.S. Cl. .............................. 358/47
[51] Int. Cl. .............................. H04n 9/06
[58] Field of Search .............................. 178/5.4 ST

[56] References Cited

UNITED STATES PATENTS

| | | | |
|---|---|---|---|
| 3,407,265 | 10/1968 | Krause | 178/5.4 ST |
| 3,495,518 | 2/1970 | Takagi et al. | 178/5.4 ST |
| 3,560,637 | 2/1971 | Takeuchi et al. | 178/5.4 ST |

*Primary Examiner*—Richard Murray

[57] ABSTRACT

A color television signal generating apparatus comprises a color-resolving striped filter, a camera tube provided with this filter, separating means for separating the output signal of the camera tube into required signals, clamping means for clamping the minimum or maximum level parts of specific signals thus separated, and matrixing means. The camera tube produces as output a superimposed signal of a direct wave signal containing signals of three primary colors of addition mixed colors and a high-band component signal comprising a group of modulated color signals representable as signals resulting from the amplitude modulation of a carrier wave of a space frequency determined by the number of groups of filter stripes in the color-resolving striped filter and carrier wave components having a high harmonic relation thereto respectively by two primary color signals. The separating means comprises first separating means for the direct signal from the above mentioned superimposed signal and second separating means for separating the high-band component signal. The clamping means comprises first clamping means for clamping the minimum (or maximum) level part of the high-band component signal and second clamping means for clamping the maximum (or minimum) level part of the high-band component signal. The matrixing means receives the output signal of the first separating means and the outputs of the first and second clamping means and produces as output three primary color signals.

9 Claims, 21 Drawing Figures

COLOR TELEVISION SIGNAL GENERATING APPARATUS

BACKGROUND OF THE INVENTION

This invention relates generally to an apparatus for generating color television signals and more particularly to a color television signal generating apparatus in a color television image-pickup apparatus such as a color television camera.

Among the color television cameras known heretofore, there is a so-called single-tube type color television camera in which a single pickup or camera tube having a color-resolving striped filter in the optical system thereof is used to generate luminance signals and color signals. Also known is a color television camera of two-tube type wherein one pickup or camera tube is used for generating luminance signals, which the other pickup tube has a color-resolving striped filter within its optical system and operates to generate color signals.

In either of the color television cameras of the above mentioned types, the color-resolving striped filters used therein are of the phase-separation system or the frequency-separation system.

In the case of a color-resolving striped filter of the phase-separation type, however, there has been the disadvantageous requirement that the color-resolving striped filter have a complicated organization provided with index stripes. Another disadvantageous requirement, furthermore, has been that for a device of complicated organization for generating sampling pulses on the basis of information obtained from these index stripes. A further problem is that, in the conversion by "sampling hold" of dot-sequential, color information signals obtained by sampling into simultaneous color information signals, noise of high frequency included in the dot-sequential, color information signals becomes stretched along the time axis and is converted into noise of conspicuous low frequency, whereby the signal-to-noise ratio becomes low.

While in the case of a color-resolving striped filter of the frequency-separation system, the above described difficulties accompanying a known color-resolving striped filter of the phase-separation system are not encountered, interference fringes (moire) due to various causes are produced since two sheets of striped filters of different space frequency values are fabricated in combination. In addition, the frequency fluctuation of a carrier wave generated in the output signal as a result of non-linearity of the deflection system of the camera tube is a large problem. Further difficulties such as shading due to a difference in degrees of modulation at the peripheral region and the central region in the target surface of the camera tube have heretofore been encountered.

SUMMARY OF THE INVENTION

It is a general object of the present invention to provide a new and useful color television signal generating apparatus in which the above described difficulties have been overcome.

More specifically, an object of the invention is to provide a color television signal generating apparatus which does not require index stripes in the color-resolving striped filter as in a phase-separation system, and in which interference fringes (moire), shading, and other deleterious effects are not produced as in a frequency-separation system.

Another object of the invention is to provide a color television signal generating apparatus having a clamping circuit for accomplishing positive clamping of the minimum level or the maximum level of a high-band component signal at a specific level without occurrence of misclamping due to clamping deficiency or failure.

Still another object of the invention is to provide a color television signal generating apparatus having filtering means for effectively separating high-band component signals from the output signal of a camera tube. By the use of such a filter means, occurrence of deformation (e.g., "sag") of the linear waveform of a signal can be prevented.

Further objects and unique features of this invention will be apparent from the following detailed description with respect to preferred embodiments of the invention when read in conjunction with the accompanying drawings, which are briefly described below.

DETAILED DESCRIPTION

Figure 1:
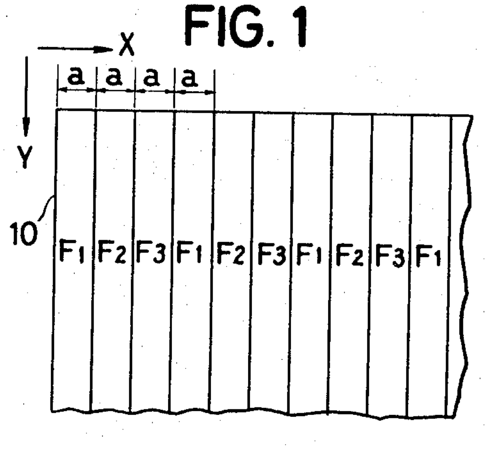
FIG. 1 is an enlarged, fragmentary frontal view of one embodiment of a color-resolving striped filter for use in the color television signal generating apparatus of the present invention.

In one embodiment of a color-resolving striped filter for use in the apparatus of the present invention as illustrated in FIG. 1, the color-resolving striped filter 10 is made up of first, second, and third filter stripes F1, F2, and F3 of equal widths *a* and of oblong narrow shape in the vertical direction laid consecutively and contiguously in the order named and constituting one group, a plurality of which are laid consecutively and contiguously side-by-side in a single plane. The widths of these filter strips may be selected at will. These filter strips F1, F2 and F3 of all groups extend in the direction (direction Y in FIG. 1) perpendicular to the horizontal scanning direction (direction X in FIG. 1) and are arrayed in an orderly manner in the above mentioned sequence, and all filter strips have the same spatial frequency.

The light transmitting characteristics respectively of these filter stripes F1, F2 and F3 are as follows. The first filter stripe F1 is adapted to transmit light of one primary color from among the three primary colors (red, green and blue) of addition mixed colors. The second filter stripe F2 is adapted to transmit light of mixed colors of the primary color transmitted through the first filter stripe and one of the two primary colors other than that transmitted through the first filter stripe. The third filter stripe F3 is adapted to transmit the light of all colors (e.g. white light).

More specifically, the second filter stripe F2 is adapted to have light transmission characteristics such that it is capable of transmitting light of colors respectively of the following relationships depending on whether the primary color transmitted through the first filter stripe F1 is red, green or blue.

| Primary color light transmitted through first filter stripe F1 | Color of light transmitted through second filter stripe F2 |
|---|---|
| red light | magenta (red blue) or yellow (red green) |
| green light | yellow (red green) or cyan (blue green) |
| blue light | magenta (red blue) or cyan (blue green) |

In one example of a color-resolving striped filter 10 of the above described organization, the first filter F1 is adapted to transmit green light (G). The second filter stripe F2 is adapted to transmit the light of a mixture color of blue light (B) and green light (G) (that is, cyan (C)). The third filter stripe F3 is adapted to transmit the light of all colors, that is, white light (W), that is, a mixed color light of red light (R), green light (G), and blue light (B).

Figure 2:
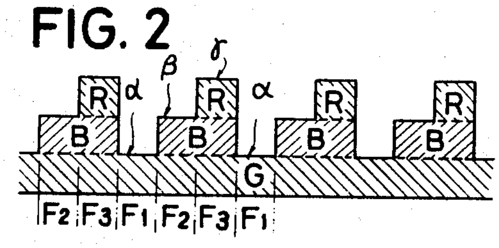
FIG. 2 is a diagram indicating the energy distribution state of transmitted light when white light is projected onto the color-resolving striped filter shown in FIG. 1.

In the case where these filter stripes F1, F2, and F3 have such light transmitting characteristics, the state of the energy of the light transmitted when a white light (W) is projected onto the color-resolving striped filter 10 becomes as illustrated by one example in FIG. 2, in which the horizontal direction (X-axis direction) represents energy distribution. That is, green light (G) is continuously distributed since it is transmitted through all filter stripes F1, F2 and F3, while blue light (B) is distributed with a width 2*a* and at space intervals of *a* since it passes through only the filter stripes F2 and F3. Red light (R) is distributed with a width *a* and at space intervals of 2*a* since it is transmitted through only the filter stripe F3.

The color television signal generating apparatus according to the present invention in which the above described color-resolving striped filter is used will now be described with respect to one embodiment thereof and with reference to FIG. 3.

Figure 3:
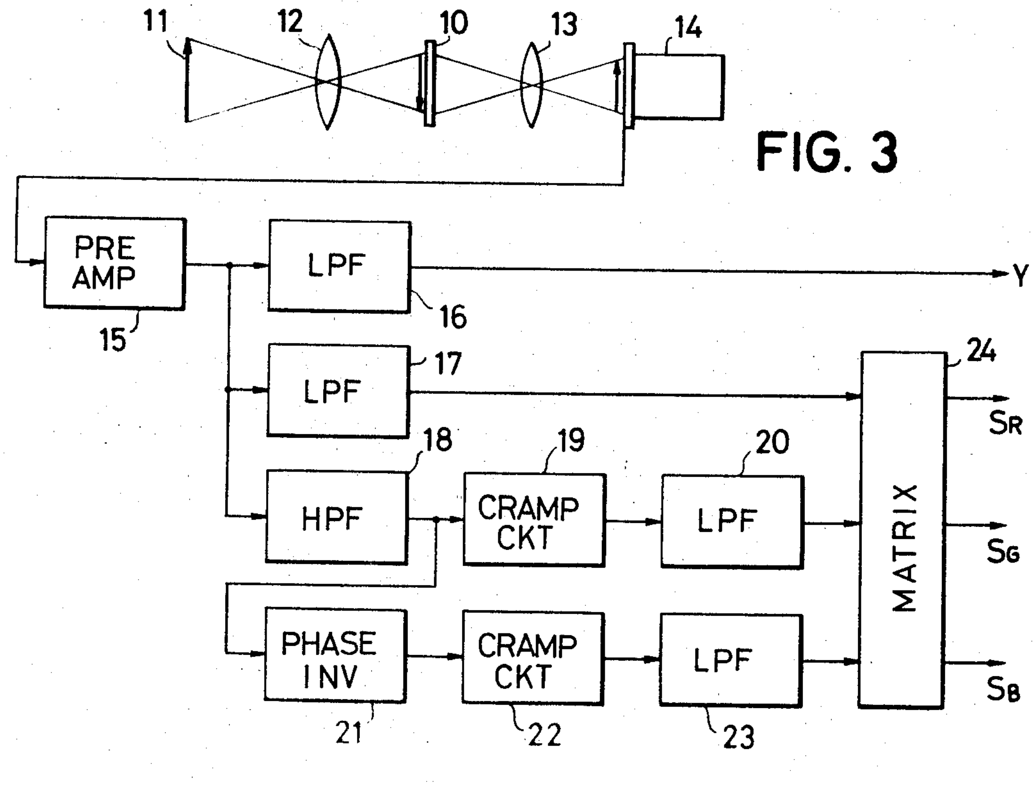
FIG. 3 is an optical diagram in combination with a block diagram illustrating the general organization of one embodiment of a color television signal generating apparatus according to the present invention.

In the apparatus diagrammatically represented in FIG. 3, the image light from an object 11 to be televised passes through the camera lens 12 of a color television camera and forms an image on the color-resolving striped filter 10. The optical image thus formed on this filter 10 is transmitted by way of a relay lens 13 and forms an image on the photoconductive surface (or photoelectric surface) of a camera tube 14.

Then, in the case where a color-resolving striped filter 10 of the characteristic indicated in FIG. 2 is used, and light of an object to be televized of white color is introduced as incident light through the camera lens 12, the resulting output signal S obtained from the camera tube 14 can be represented as $S = Sd + Sm$, where the signal $Sd$ is a direct wave (not modulated) signal comprising a mixture of a luminance signal Y, a signal $Sg$ due to green light, a signal $S_B$ due to blue light, and a signal $S_R$ due to red light and can be represented by $$Sd = S_G + 2S_B/3 + S_R/3 \quad (1)$$

The signal $Sm$ is a high-band component comprising a group of modulated color signals of forms resulting from amplitude modulation of a carrier wave of a space frequency value determined by the number of groups of filter stripes F1, F2 and F3 of the color-resolving striped filter 10 and a carrier wave and the like having high-frequency relationship to the carrier wave of the above mentioned space frequency value by a mixture signal made up of two primary colors other than the primary color light (which is green color light in the instant example) passing through the first filter stripe F1.

Figure 4:
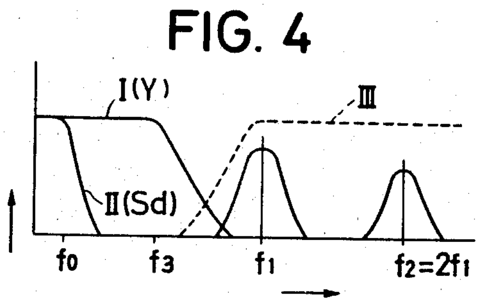
FIG. 4 is a graphical representation indicating frequency responses of the output signal of a camera tube and the filtering characteristic of a filter in the apparatus of the invention.

The above mentioned output signal S of the camera tube 14 is amplified by a preamplifier 15 and then supplied to low-pass filters 16 and 17 and a high-pass filter 18. The low-pass filter 16 has a filtering characteristic I of an upper-limit cut-off frequency $f3$ of approximately 2.5 MHz as indicated in FIG. 4, from which a luminance signal Y is derived. The low-pass filter 17 has a filtering characteristic II of an upper-limit cut-off frequency $f_0$ of approximately 0.5 MHz, from which the above mentioned direct signal $Sd$ is derived. The high-pass filter 18 has a filtering characteristic III of a lower-limit cut-off frequency $f_1$, from which the above mentioned high-band component signal $Sm$ is derived.

In FIG. 4, freqeuncy $f_1$ indicates a carrier wave of a space frequency value determined by the number of filter stripe groups of the color-resolving striped filter 10, this frequency being approximately 3.25 MHz in the case, for example, of 170 groups of the filter stripes. The frequency $f_2$ indicates the second harmonics (of approximately 6.5 MHz) of the carrier wave of the above mentioned frequency $f_1$.

In the case where a color-resolving striped filter of the characteristic indicated in FIG. 2 is used, only a modulated color signal having a component of the signal $S_B$ due to blue light B and a modulated color signal having a component of the signal $S_R$ due to red light R exist in the signal $Sm$, and a signal component due to green light G is not contained therein.

The high-band component signal $Sm$ filtered by the high-pass filter 18 is subjected to clamping at a specific voltage in its part of minimum level (or maximum level) at specific time intervals in a clamping circuit 19. The resulting output signal of the clamping circuit 19 is supplied to a low-pass filter 20.

At the same time, the output signal $Sm$ of the high-pass filter 18 is also passed through a phase-inversion circuit (inverter) 21 and then supplied to a clamping circuit 22. This clamping circuit 22 operates to clamp at a specific voltage level the minimum level part (or the maximum level part) of the high-band component signal ($-Sm$) thus inverted. The output signal of the clamping circuit 22 is supplied to a low-pass filter 23. The low-pass filters 20 and 23 are provided in accordance with the necessity, and the pass-band width thereof may be the same as that of the above mentioned low-pass filter 17.

The output signals of the these low-pass filters 17, 20 and 23 are supplied to a matrixing circuit 24, where they are matrixed. At a result, separate primary color signals $S_R$, $S_G$, and $S_B$ are obtained from the matrixing circuit 24.

The operations of the clamping circuits 19 and 22 will not be considered in greater detail.

A first two-color mixture signal $Sm1$ which has been clamped in its minimum level signal part at a specific potential by the clamping circuit 19 and then supplied through the low-pass filter 20 to the matrixing circuit 24 can be represented by the following equation.

$$Sm1 = 2S_B/3 + S_R/3 \qquad (2-1)$$

When the operation $(Sd - Sm1)$ is carried out by the matrixing circuit 24 with respect to the signals $Sd$ and $Sm1$ represented by the foregoing Eqs. (1) and (2–1), the following result is obtained.

$$Sd - Sm1 = S_G \qquad (3)$$

Thus, only the signal $S_G$ of green light is derived.

Then, no matter how the mathematical operation is carried out, a blue light signal $S_B$ only or a red light signal $S_R$ only cannot be derived separately from these two signals $Sd$ and $Sm1$ represented by the Eqs. (1) and (2–1).

Accordingly, in accordance with the present invention, in the case where the first two-color mixture signal $Sm1$ is obtained from the high-band component signal $Sm$, a clamping operation which is separate from the clamping operation carried out with respect to the high-band component signal $Sm$ is carried out with respect to the high-band component signal $Sm$ thereby to obtain a second two-color mixture signal $Sm2$. Then, by carrying out operations with these first and second two-color mixture signals $Sm1$ and $Sm2$, it is possible to obtain separately a blue light signal $S_B$ and a red light signal $S_R$.

Then, in the case where the minimum level part of the high-band component signal $Sm$ is clamped at a specific voltage by means of the first clamping circuit 19, to obtain the first two-color mixture signal $Sm1$, the maximum level part of the high-band component signal $Sm$ is clamped at a specific voltage by means of the second clamping circuit 22 thereby to obtain the second two-color mixture signal $Sm2$. Conversely, in the case where the maximum level part of the high-band component signal $Sm$ is clamped by means of the first clamping circuit 19, the minimum level part of the signal $Sm$ is clamped by means of the second clamping circuit 22.

Figure 5:
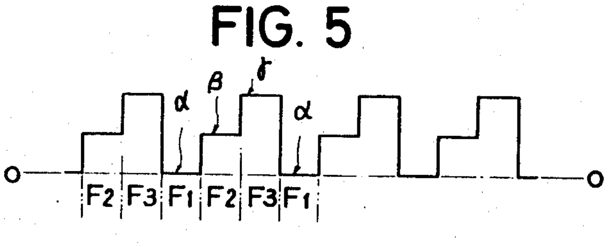
FIGS. 5 and 6 are diagrams respectively indicating output signal waveforms of a clamping circuit in the apparatus of the invention.

The output waveform of the clamping circuit 19 obtained when the clamping circuit 19 clamps the minimum level part of the high-band component signal $Sm$ at a specific voltage level (the ground potential in the instant example) is shown in FIG. 5. As is apparent from FIG. 2, the minimum level part of the high-band component signal $Sm$ is produced in correspondence with that part of the filter stripe F1 which transmits only green light in each filter stripe group of the color-resolving striped filter. The maximum level part of the signal $Sm$ is produced in correspondence with that part of the filter stripe F3 transmitting light of all colors in each filter stripe group. Accordingly, when the minimum level part of the signal $Sm$ within the output signal S of the camera tube 14 is clamped at specific potential in the clamping circuit 19, the signal part produced in correspondence with the filter stripe F1 becomes clamped at the specific potential.

In the case where the clamping circuit 19 is adapted to clamp the maximum level part of the signal $Sm$ at a specific potential, the signal part produced in correspondence to the filter stripe F3 becomes clamped at the specific potential.

Figure 6:
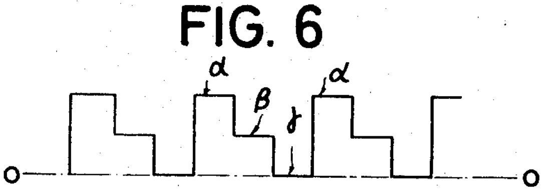

The inverted output waveform of the clamping circuit 22 obtained when it clamps the minimum level part of the signal $Sm$ at a specific voltage level is shown in FIG. 6. In FIG. 6, the minimum level part $\gamma$ of the signal clamped at the specific voltage corresponds to the maximum level part, that is, to the level part $\gamma$ of the signal corresponding to the light of all colors (white light) W transmitted through the filter stripe F3. Therefore, the specific voltage level at which the minimum level part $\gamma$ of the signal is clamped represents white light W in FIG. 6.

Then, by causing the parts designated by $\alpha$, $\beta$ and $\gamma$ in FIG. 6 to correspond to the parts designated by $\alpha$, $\beta$ and $\gamma$ in FIG. 2, the content of the signals of the parts $\alpha$ and $\beta$ shown in FIG. 6 will be considered. The part $\alpha$ in FIG. 6 represents the level of a signal due to the light resulting from the subtraction of green light G from white light W of the clamping level, that is, the light of $(W - G) = (R + B)$. The part $\beta$ in FIG. 6 represents the level of a signal due to the light resulting from the subtraction of a mixed color light of green light G and blue light B from white light W of the clamping level, that is, the light of $\{W - (G + B)\} = R$. Therefore, the second two-color mixture signal $Sm2$ supplied from the clamping circuit 22 through the low-pass filter 23 to the matrixing circuit 24 can be represented by the following equation.

$$Sm2 = 2S_R/3 + S_B/3 \qquad (2-2)$$

Accordingly, by carrying out the operation $(Sm1 \times 2) - (Sm2)$, where $Sm1$ and $Sm2$are as defined above, a blue light signal $S_B$ is obtained. Furthermore, by carrying out the operation $(Sm2 \times 2) - (Sm1)$, a red light signal $S_R$ is obtained.

It is necessary to select the time intervals of the operations of the clamping circuits 19 and 22 within a range wherein the color reproducibility of the signals is not impaired. As a limiting value of this specific time interval, a time value determined by $1/f_0$ in the case, for example, where the cut-off frequency of the low-pass filters 17, 20 and 23 is denoted by $f_0$ becomes a guideline value.

In the organization of the clamping circuits 19 and 22, a circuit of known arrangement can be used for the circuit for reproducing direct-current components. In the case where these clamping circuits are to be arranged as so-called diode clampers comprising components such as coupling capacitors, diodes, and discharging resistors, it is necessary in each case to exercise care in the selection of the discharge time constant determined by the coupling capacitor and the discharge resistor so that it is within a range (for example, less than approximately $3 \times 10^{-7}$ sec.) which will not impair the color reproducibility.

In the case where the clamping circuit 19 is to be in the form of a clamper of opening-closing type, it is so adapted that the position of the minimum level part or the maximum level part of the high-band component signal $Sm$ is detected to generate keying pulses, which are used to activate the clamper of the opening-closing type. By this arrangement, it is possible to carry out excellent clamping operation even when there is some fabrication deviations in the filter stripe widths of the color-resolving striped filter used, or when there is a non-linear distortion in the deflection system of the camera tube.

Furthermore, for each of these clamping circuits 19 and 22, a circuit organization containing circuits such as a circuit for accomplishing envelope detection of the minimum level part of the high-band component signal $Sm$, a circuit for inverting the phase of the output signal of this detection circuit, and a circuit for adding the resulting phase-inverted signal and the original signal may be used.

While the present invention has been described above with respect to a specific example thereof of the single tube type wherein only one camera tube is employed, it will be obvious, of course, that the invertion can be applied also to a pickup apparatus of the two-tube type wherein a total of two camera tubes, one for luminance signals and the other for color signals, are employed.

The apparatus of the present invention has the following advantageous features.

1. Since a filter comprising filter stripes F1, F2 and F3 of respectively equal space frequency are used for the color-resolving striped filter, there is no occurrence of moire.

2. Since the system is not a phase separation system, stripes for generating index pulses are not necessary in the color-resolving striped filter, the camera tube, end other parts. Therefore, the organizations of the color-resolving striped filter and the camera tube become simple and can be readily fabricated. Furthermore, since the rate of utilization of the incident light quantity is improved, bias light is unnecessary.

3. By so adjusting the spectral response characteristics of the filter stripes F1, F2 and F3 of the color-resolving striped filter and the spectral respone characteristic of the camera tube that the output levels of the three primary color signals $S_R$, $S_G$ and $S_B$ respectively become equal at the time of pick up of all-color light (white light), shading due to the modulation degree characteristic of the camera tube can greatly reduced.

Examples of modification and specific embodiments of practice of the color-resolving striped filter 10, the high-pass filter 18, the clamping circuits 19 and 22, and other components constituting important parts of the apparatus of the invention will now be described.

The color-resolving striped filter is not limited to that of the structure indicated in FIG. 1, it being possible to form filter stripe groups each of four or more stripes by suitable combinations of the above mentioned filter stripes F1, F2 and F3. Next, various embodiments thereof will be described.

Figure 7:
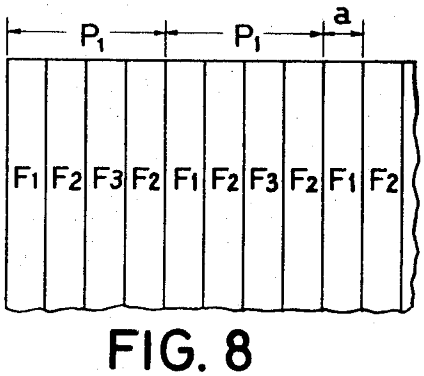
FIG. 7 is an enlarged, fragmentary frontal view of another embodiment of a color-resolving striped filter.
Figure 8:
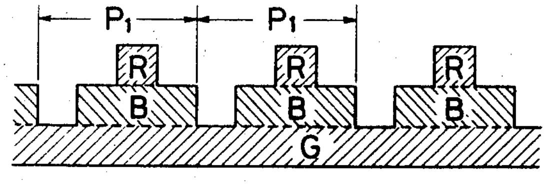
FIGS. 8 and 9 are diagrams respectively indicating transmitted light energy and output signal waveform in the case where the color-resolving striped filter shown in FIG. 7 is used.

In the embodiment illustrated in FIG. 7, four filter stripes F1, F2, F3 and F2 are disposed contiguously in the sequence named to constitute one group, and a plurality of these filter stripe groups are disposed contiguously and successively to form a color-resolving striped filter. The waveform of the output signal of the camera tube in the case where this filter is used is indicated in FIG. 8. This output signal of the camera tube can be expressed as a periodic function wherein the pitch P1 of the filter stripe groups is the fundamental repeated period. Here, the direct signal (direct-current component) Sda can be represented by the following equation.

$$Sda = S_G + 3S_B/4 + S_R/4 \qquad (1a)$$

Figure 9:
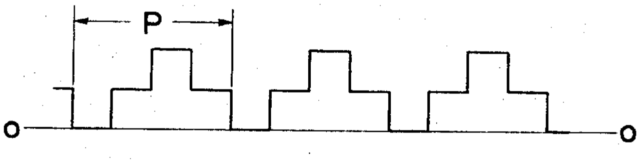

The first two-color mixture signal $Sm1a$ which results when the high-band component signal $Sm$, after the minimum level part thereof has been clamped at a specific potential by means of the clamping circuit 19, is supplied by way of the low-pass filter 20 to the matrixing circuit 24 assumes the waveform shown in FIG. 9 and can be represented by the following equation.

$$Sm1a = 3S_B/4 + S_R/4 \qquad (2\text{-}1a)$$

The above mentioned direct signal $Sda$ and first two-color mixture signal $Sm1a$ are matrixed in the matrixing circuit 24 and subjected to the operation ($Sda - Sm1a$), whereby from $Sda = Sm1a = S_G$, a green light signal $S_G$ is derived.

Figure 10:
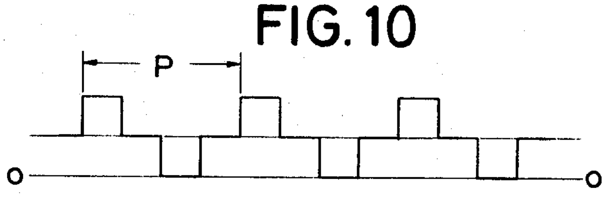
FIG. 10 is a diagram indicating a phase-inverted signal waveform corresponding to the signal waveform shown in FIG. 9.
Figure 11:
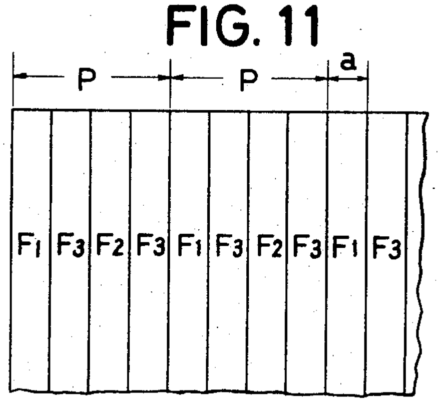
FIGS. 11 through 16 are enlarged, fragmentary frontal views respectively showing further embodiments of color-resolving striped filters.
Figure 12:
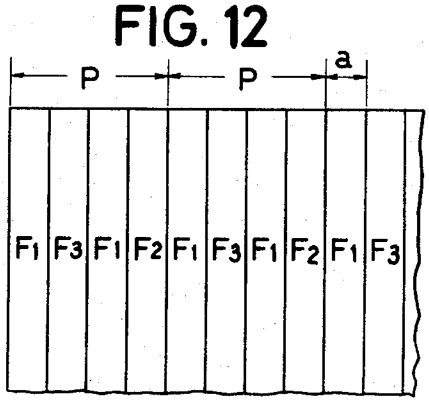
Figure 13:
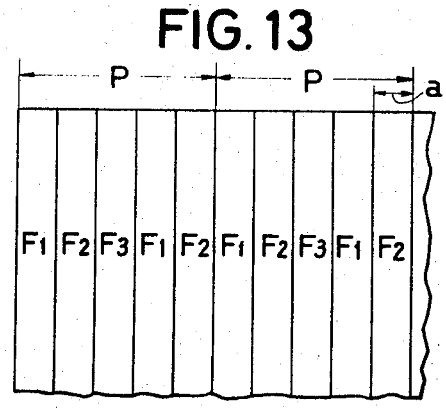
Figure 14:
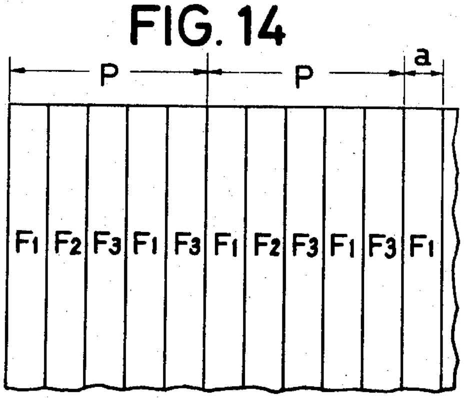
Figure 15:
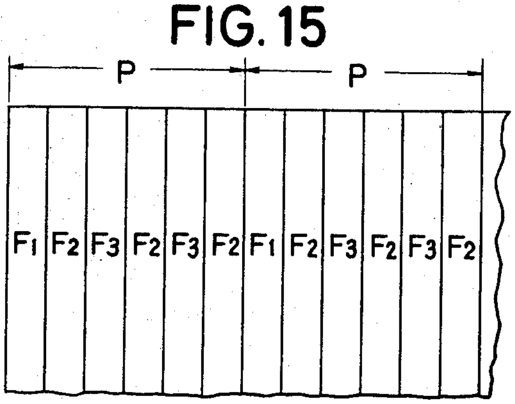
Figure 16:
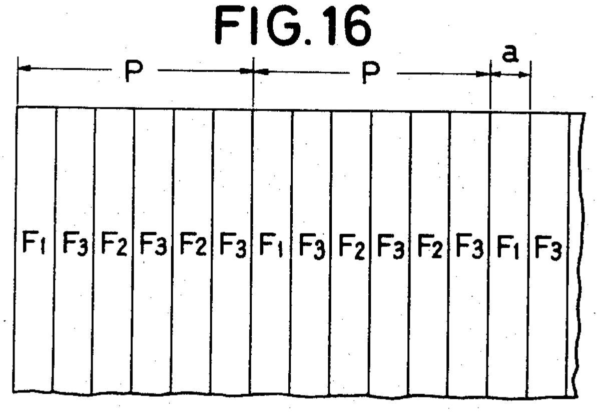

On the other hand, the second two-color mixture signal $Sm2a$ supplied to the matrixing circuit 24 when the output signal $Sm$ of the high-pass filter 18, after being phase inverted by the phase inversion circuit 21, and after its maximum level part has been clamped by the clamping circuit 22, is passed through the low-pass filter 23 assumes the waveform indicated in FIG. 10 and can be represented by the following equation.

$$Sm2a = S_B/4 + 3S_R/4 \qquad (2\text{-}2a)$$

Then, by carrying out the operation $\{(Sm1a) \times 3/2\} - \{Sm2a\}$ in the matrixing circuit 24, a blue light signal $S_B$ is obtained, while by carrying out the operation $\{(Sm2a) \times 3/2\} - \{Sm1a\}$, a red light signal $S_R$ is derived.

Further examples of different combinations of the filter stripes F1, F2 and F3 are illustrated in FIGS. 11 through 16. In the example shown in FIG. 11, four filter stripes F1, F3, F2 and F3 are disposed contiguously and successively in that order to constitute one filter stripe group. In the example shown in FIG. 12, four filter stripes F1, F3, F1 and F2 are disposed contiguously and successively in the order to constitute one filter stripe group. In the example shown in FIG. 13, five filter stripes F1, F2, F3, F1 and F2 are disposed contiguously and successively in that order to constitute one filter stripe group. In the example shown in FIG. 14, five filter stripes F1, F2, F3, F1 and F3 are disposed contiguously and successively in that order to constitute one filter stripe group. In the example shown in FIG. 15, six filter stripes F1, F2, F3, F2, F3 and F2 are disposed contiguously and successively in that order to constitute one filter stripe group. In the example shown in FIG. 16, six filter stripes F1, F3, F2, F3, F2 and F3 are disposed contiguously and successively to constitute one filter stripe group.

Figure 17:
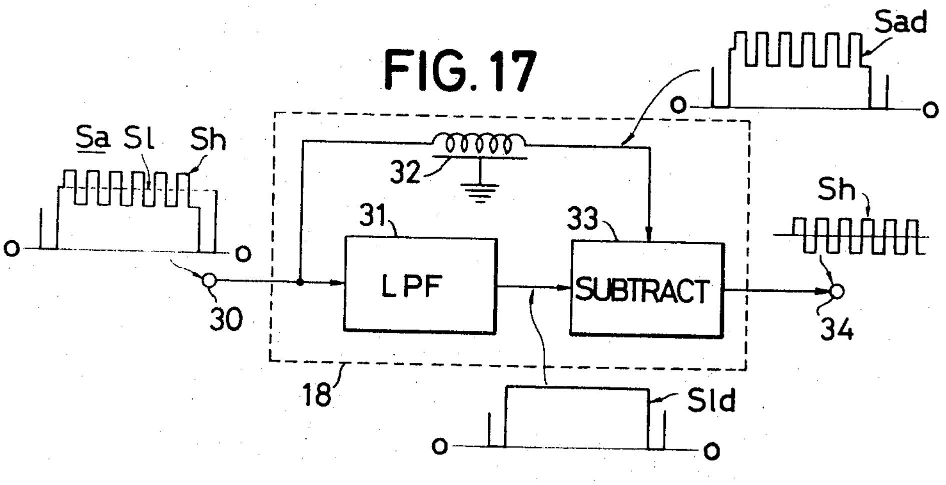
FIG. 17 is a schematic diagram of one embodiment of a high-pass filter suitable for use in the apparatus illustrated in FIG. 3.

A desirable embodiment of the high-pass filter 18 will now be described with reference to FIG. 17. The output signal of a camera tube (not shown) introduced into the high-pass filter 18 through an input terminal 30 is supplied to a low-pass filter 31 and a delay circuit 32. Here, for the sake of simplifying the description and illustration, it will be assumed that the input signal arriving at the input terminal 30 is a signal resulting from the superimposition of a signal S*h* (indicated in FIG. 17 as a signal of square waveform of a repetitive period $1/f_1$) having a single, fundamental repetitive period containing harmonics components on a low-band signal S*l*. Furthermore, use is made of a low-pass filter 31 having a pass-band characteristic such that it will not pass also a signal component (the signal component of frequency $f_1$ in the example shown in FIG. 17) of the fundamental repetition frequency of the signal S*h* having one or more fundamental repetitive periods respectively containing harmonics components included within an all-band signal S*a*.

From within the above mentioned all-band signal S*a* supplied to the input terminal 30, only a low-band signal S*l* is derived by the low-pass filter 31 and is supplied as a subtrahend signal S*ld* to a subtractor 33. On one hand, the all-band signal S*a* supplied through the input terminal 30 is delayed by the delay quantity which the low-band signal S*l* receives in the low-pass filter 31, and then the all-band signal thus delayed is supplied as a minuend signal S*ad* to the subtractor 33.

Since direct-current components are contained in both the minuend signal S*ad* and the subtrahend signal S*ld*, the operation in the subtractor of subtracting the subtrahend signal S*ld* from the minuend signal S*ad* is carried out with both signals in the state wherein they are containing direct-current components. Accordingly, from the output terminal 34, a high-band signal S*m* which has not been subjected to linear waveshaping (e.g., sag) is effectively obtained.

Figure 18:
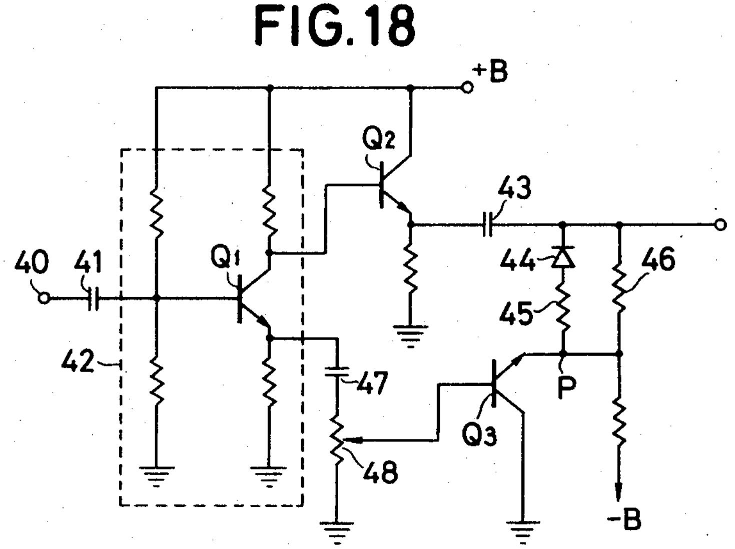
FIG. 18 is a circuit diagram of one embodiment of a clamping circuit suitable for use in the apparatus shown in FIG. 3.

Next, a specific example of the aforedescribed clamping circuit 19 will be described with reference to FIG. 18 showing one embodiment of a specific electrical circuit for the clamping circuit 19.

A signal to be clamped is introduced through an input terminal 40 and is sent through a capacitor 41 to a phase inversion circuit 42 shown within an intermittent line enclosure, where the signal is rendered into two signals of mutually opposite phase, which are derived respectively from the collector and emitter of transistor Q1 in the circuit 42. The signal thus obtained from the collector of the transistor Q1 is passed through a transistor Q2 of emitter follower connection and sent as a signal to be clamped to a diode clamping circuit comprising a capacitor 43, a diode 44, a discharge resistor 46, and other components. On the other hand, the signal obtained from the emitter of the transistor Q1 is applied by way of alternating-current coupling means including a capacitor 47 to level adjusting means comprising a variable resistor 48 and then supplied to a transistor Q3 of emitter follower connection. The output signal of the transistor Q3 is applied as a clamping correction signal to the setting point P of the clamping potential with respect to the peak value of the signal to be clamped in the diode clamping circuit.

Figure 19:
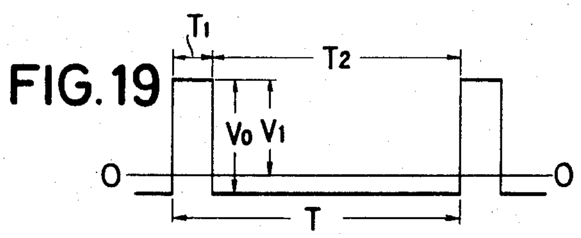
FIGS. 19, 20A and 20B are signal waveform diagrams for a description of the operation of the clamping circuit shown in FIG. 18.

One example of the waveform of the clamping correction signal applied to the above mentioned point P is shown in FIG. 19. In this diagram, the line 0—0 indicates an alternating-current mean level. This clamping correction signal is adjusted to a specific peak value as described hereinafter by the variable resistor 48. So that the time position of the time interval T1 of the clamping signal peak value will coincide with the time position of the corresponding time interval T1 in the signal to be clamped, the time constant C2 × R2 (where C2 is the capacitance value of the capacitor 47, and R2 is the resistance value of the variable resistor 48) with respect to the clamping correction signal is made equal to the discharge time constant C1 ×R1 (where C1 is the capacitance value of the capacitor 43, and R1 is the resistance value of the resistor 46) in the clamping circuit, and, furthermore, the phase characteristic, the frequency amplitude characteristic and the like of the clamping signal circuit are made the same as those of the clamping circuit.

In the clamping correction signal indicated in FIG. 19, the voltage VI of the part in the positive direction from the level line 0—0 can be expressed as follows.

$$V1 = V_0\ (T2/T1 + T2) \qquad (4)$$

where $V_0$ is the peak value, and T2 is the period within one cyclic period exclusive of the period T1.

Figure 20A:
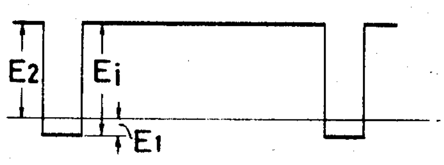

In the circuit shown in FIG. 18, the peak value of the signal to be clamped applied by way of the capacitor 43 is clamped at the potential applied to the point P. The case of a circuit which is not of the above described organization, that is, the case where a clamping correction signal is not being applied to the point P will now be considered. In this case, since the peak value part of the signal to be clamped is used for charging the capacitor 43, a misclamping due to clamping deficiency by E1 occurs in the signal to be clamped as indicated in FIGS. 20A.

The quantity E1 of this clamping deficiency will now be determined. The quantity of the charge with which the capacitor 43 is charged in the charging time T1 will be assumed to be equal to the quantity of the discharge in the discharging period T2. Then, the following relationship can be written by denoting the conduction resistor (designated by reference numeral 45) of the diode 44 by R*d* and the resistance value of the discharge resistor 46 by RL.

$$T1E1/Rd = T2E2/RL$$

From this relationship, the quantity of clamping deficiency E1 can be determined as follows.

$$E1 = E2T2Rd/T1RL$$

Here, E2 = E*i* − E1. Then when the ratio R*d*/RL is denoted by $\beta$, the above quantity E1 becomes E1 = T2E*i*$\beta$/T1 + T2$\beta$. Then, since the relationship T1

$>>T2\beta$ exists, the above quantity E1 can be expressed as follows $$E1 \approx T2Ei\beta/T1 \quad (5)$$

Figure 20B:
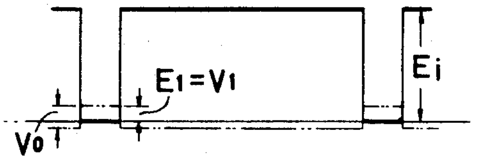

In the circuit of the instant example, however, a clamping correction signal indicated in FIG. 19 is being applied to the point P, and for this reason, the extreme tip of the peak value part of the signal being clamped is thrust upward from below by the extreme tip of the clamping correction signal. As a result, the extreme tip of the peak value part of the signal being clamped which is thus thrust upward coincides with the clamping level as indicated in FIG. 20B. Therefore, misclamping due to clamping deficiency or failure does not occur in the signal being clamped.

The magnitude of the clamping correction signal for causing the extreme tip of the peak value part of the signal being clamped to coincide exactly with the clamping level (clamping potential) can be determined by equating the value of E1 expressed by Eq. (5) and the value of V1 expressed by Eq. (4), that is, by solving the equation Eq. (5) − Eq. (4) = 0.

$$\text{Eq. }(5) - \text{Eq. }(4) = E1 - V1 = T2Ei\beta/T1 - T2V_o/T1 + T2$$

$$= T2(T1Ei\beta + T2Ei\beta - T1V_o)/T1(T1 + T2)$$

By substituting the relationship $T2 = T - T1$ into the above equation, it becomes $$E1 - V1 = (T - T1)(TEi\beta - T1V_o)/T \cdot T1\beta$$

Accordingly, in order to obtain the relationship $E1 - V1 = 0$, it is necessary that $TEi\beta - T1V_o = 0$.

$$V_o = Te2\beta/T1 \quad (6)$$

Thus, a clamping correction signal of a magnitude representable by the above Eq. (6) is capable of reducing misclamping to zero.

Therefore, by using a diode clamping circuit as described above and illustrated in FIG. 18, it is possible to prevent occurrence of misclamping and to achieve excellent clamping.

Further, this invention is not limited to these embodiments but various variations and modifications may be made without departing from the scope and spirit of the invention.

What we claim is:

1. A color television signal generating apparatus comprising:

a color-resolving striped filter comprising a plurality of groups of filter stripes, said groups being disposed parallelly and consecutively in sequentially repeated arrangement each of said groups comprising at least three filter stripes from among a first filter stripe having a light transmission characteristic such as to transmit the light of one of the three primary colors of an addition mixture color, a second filter stripe having a light transmission characteristic such as to transmit the light of a mixed color of the primary color transmitted through said first filter stripe and one of the other two primary colors, and a transparent third filter stripe transmitting white light, said at least three filter stripes being arranged parallelly and consecutively in a specific sequence;

a camera tube provided with said color-resolving striped filter disposed on the front surface thereof and operating to send out as an output signal a superimposed signal comprising, in superimposition, a direct wave signal containing signals of the three primary colors of said addition mixture color and a high-band component signal comprising a group of modulated color signals representable as signals resulting from the amplitude modulation respectively of a carrier wave of a frequency equal to a space frequency determined by the number of said groups of filter stripes and carrier wave components of frequencies having higher harmonic relationships to the frequency of said carrier wave by the signals of two primary colors other than the primary color of the light transmitted through said first filter stripe;

first separation means for separating said direct wave signal from the output signal of said camera tube;

second separation means for separating said high-band component signal from the output signal of the camera tube;

first clamping means for clamping at a specific voltage level one of two limiting level parts, namely, the minimum level part and the maximum level part, of the high-band component signal obtained as output of said second separation means and obtaining a first two-color mixture signal;

second clamping means for clamping at a specific voltage level the other of said two limiting level parts and obtaining a second two-color mixture signal; and matrixing means supplied respectively with the direct wave signal produced as output of said first separation means, said first two-color mixture signal of the output of said first clamping means, and said second two-color mixture signal of the output of said second clamping means and operating to matrix said signals thus supplied and to produce three primary color signals.

2. A color television signal generating apparatus as claimed in claim 1 in which said second clamping means is adapted to clamp the maximum level part of the high-band component signal produced as output of said second separation means in the case where said first clamping means is adapted to clamp the minimum level part of said output high-band component signal and is adapted to clamp the minimum level part of said output signal in the case where the first clamping means is adapted to clamp the maximum level part of said output signal.

3. A color television signal generating apparatus as claimed in claim 1 in which a phase inversion means is further provided between said second separation means and said second clamping means and operates to invert the phase of the high-band component signal produced as output of the second separation means, and the second clamping means is adapted to clamp the minimum level part of the high-band component signal produced as output of said phase inversion means in the case where said first clamping means is adapted to clamp the minimum level part of the high-band component signal produced as output of the second separation means and is adapted to clamp the maximum level part of said output signal of the inversion means in the case where the first clamping means is adapted to clamp the maximum level part of said output signal of the second separation means.

4. A color television signal generating apparatus as claimed in claim 1 in which said first and second clamping means are adapted to carry out clamping of limiting level parts of signals at each time interval within a range wherein the color reproducibility is not impaired.

5. A color television signal generating apparatus as claimed in claim 1 which further comprises first and second low-pass filters respectively between said first and second clamping means and the matrixing circuit.

6. A color television signal generating apparatus as claimed in claim 1 in which each of said groups of filter stripes comprises said first, second, and third filter stripes and at least one additional filter stripe selected from said first, second, and third filter stripes, all disposed contiguously and successively in the sequence named.

7. A color television signal generating apparatus as claimed in claim 1 in which said second separation means comprises: low-pass filtering means having a filtering characteristic in a band which is unnecessary for the second separation means; delay means for accomplishing a time delay equal to the delay in said low-pass filtering means with respect a signal not passing through said low-pass filtering means; and subtraction means operating to subtract the output signal of said low-pass filter means from the output signal of said delay means and to obtain an output signal of a specific required band as said second separation means.

8. A color television signal generating apparatus as claimed in claim 1 in which said first and second clamping means comprise a circuit for electrostatically charging and discharging in accordance with the peak value of the high-band component signal and clamping said peak value at a specific potential, a circuit for phase inverting said high-band component signal, and a circuit operating to adjust the level and time constant of the output signal of said phase inversion circuit and thereafter supplying the signal as a clamping correction signal to the set point of the clamping potential of said clamping circuit.

9. A color television signal generating apparatus as claimed in claim 1 which further comprises third separation means for separating a luminance signal component from the output signal of said camera tube.

* * * * *